(12) United States Patent
Ganzel et al.

(10) Patent No.: US 10,710,563 B2
(45) Date of Patent: Jul. 14, 2020

(54) PUMP ATTENUATOR BYPASS VALVE

(71) Applicant: Kelsey-Hayes Company, Livonia, MI (US)

(72) Inventors: Blaise J. Ganzel, Livonia, MI (US); William P. Caldwell, Livonia, MI (US); Joseph F. Zeoli, Livonia, MI (US)

(73) Assignee: ZF Active Safety US Inc., Livonia, MI (US)

( * ) Notice: Subject to any disclaimer, the term of this patent is extended or adjusted under 35 U.S.C. 154(b) by 161 days.

(21) Appl. No.: 15/506,309

(22) PCT Filed: Nov. 2, 2015

(86) PCT No.: PCT/US2015/058570
§ 371 (c)(1),
(2) Date: Feb. 24, 2017

(87) PCT Pub. No.: WO2016/070169
PCT Pub. Date: May 6, 2016

(65) Prior Publication Data
US 2017/0240155 A1 Aug. 24, 2017

Related U.S. Application Data

(60) Provisional application No. 62/073,568, filed on Oct. 31, 2014.

(51) Int. Cl.
*B60T 8/40* (2006.01)
*B60T 13/68* (2006.01)
(Continued)

(52) U.S. Cl.
CPC ............ *B60T 8/4068* (2013.01); *B60T 8/341* (2013.01); *B60T 11/103* (2013.01);
(Continued)

(58) Field of Classification Search
CPC ...... B60T 8/4068; B60T 8/341; B60T 8/4872; B60T 11/103; B60T 17/02; B60T 17/04; B60T 13/686
See application file for complete search history.

(56) References Cited

U.S. PATENT DOCUMENTS

3,393,508 A * 7/1968 Alton .................. F15B 9/00
60/430
5,031,969 A 7/1991 Siegel
(Continued)

*Primary Examiner* — Melody M Burch
(74) *Attorney, Agent, or Firm* — MacMillian, Sobanski & Todd, LLC (57) ABSTRACT

A pump attenuator bypass valve (40/100/200) is located at an outlet of a pump (30) in a vehicle braking system (10) between the pump (30) and an attenuator (34). The attenuator bypass valve (40/100/200) includes a bypass valve housing (41), a first fluid flow path (74, 57/179/220, 208), and a second fluid flow path (80/183). The first fluid flow path (74, 57/179/220, 208) is defined in the housing (41) and is configured to allow continuous flow of fluid when the pump (30) operates at a first pump flow rate. The second fluid flow path (80/183) is defined in the housing (41) and is configured to bypass the first fluid flow path (74, 57/179/220, 208) and to allow continuous flow of fluid when the pump (30) operates at a second pump flow rate higher than the first pump flow rate.

8 Claims, 4 Drawing Sheets

(51) Int. Cl.
*B60T 17/04* (2006.01)
*B60T 11/10* (2006.01)
*B60T 17/02* (2006.01)
*B60T 8/34* (2006.01)
*B60T 8/48* (2006.01)

(52) U.S. Cl.
CPC ............ *B60T 13/686* (2013.01); *B60T 17/02* (2013.01); *B60T 17/04* (2013.01); *B60T 8/4872* (2013.01)

(56) References Cited

U.S. PATENT DOCUMENTS

| | | | |
|---|---|---|---|
| 5,058,961 A * | 10/1991 | Mergenthaler | B60T 8/341 303/115.4 |
| 5,295,740 A * | 3/1994 | Watanabe | B60T 8/341 303/113.2 |
| 5,713,641 A * | 2/1998 | Hosoya | B60T 8/4872 303/117.1 |
| 8,671,680 B2 | 3/2014 | Kley et al. | |
| 2007/0052290 A1* | 3/2007 | Hwang | B60T 7/122 303/115.1 |
| 2013/0062933 A1 | 3/2013 | Daher | |

* cited by examiner

PUMP ATTENUATOR BYPASS VALVE

CROSS-REFERENCE TO RELATED APPLICATIONS

This application claims the benefit of U.S. Provisional Application No. 62/073,568, filed Oct. 31, 2014, the disclosure of which is incorporated herein by reference.

BACKGROUND OF THE INVENTION

This invention relates in general to attenuator bypass valves used in combination with pulsation attenuators that reduce the amplitude of pressure fluctuations in hydraulic fluid lines of vehicular braking systems. In particular, this invention relates to an improved structure for such an attenuator bypass valve that includes a flow based orifice bypass function during high pump flow events while maintaining the orifice restriction and low noise, vibration, and harshness (NVH) behavior during low pump flow events.

Devices for autonomously generating brake pressure include pumps, such as piston pumps. In particular, the conveyance of brake fluid through piston pumps generates pulsations, which can spread audibly via brake circuits and also affect the noise level in the vehicle's interior. To dampen noise or pulsations, devices for autonomously generating brake pressure are known that feature an attenuator or an orifice on the outlet side of the pump.

The use of attenuators, which reduce amplitude of pressure fluctuations in hydraulic fluid lines of vehicular braking systems, is well known. In particular, attenuators are common in vehicular anti-lock braking systems (ABS) at the outlet end of an ABS hydraulic pump used to evacuate a low pressure accumulator. A hydraulic control unit (HCU) includes a housing having bores for mounting valves and the like and channels for directing fluid. An attenuator may be mounted in a bore in the HCU to significantly reduce the amplitude of high energy pressure pulses in the brake fluid at the outlet of the pump. These pressure pulses can create undesirable noise, which is transmitted to the master cylinder or its connection to the vehicle. These pressure pulses can also cause undesirable brake pedal vibrations.

A typical attenuator includes a chamber filled with brake fluid. An inlet passage delivers fluid from the outlet end of the pump to the chamber, and an orifice of substantially reduced diameter directs fluid from the chamber to an outlet passage. The restriction of fluid flow through the orifice attenuates pressure fluctuations as a result of the compressibility of the brake fluid. Thus, brake fluid in the chamber absorbs high energy fluid pulses and slowly releases the fluid through the orifice.

U.S. Pat. No. 8,671,680 shows an attenuator 7 in an HCU of a brake system. The attenuator 7 includes an attenuation chamber 8 having a fixed orifice 9 and a switchable orifice 10. The fixed orifice 9 is about twice as large as the switchable orifice 10. The switching function of the switchable orifice 10 is performed by a ball-check valve 11. The ball-check valve 11 is controlled by differential pressure and is configured to open at a predetermined cracking pressure. If the pressure difference at the ball-check valve 11 is not sufficient to open the ball-check valve 11, then fluid will flow initially through the switchable orifice 10, then through the fixed orifice 9 with the relatively larger orifice opening. When the pressure difference on the ball-check valve 11 reaches the predetermined cracking pressure, the ball 13 will lift up from its valve seat 14 so that the pulsating flow rate/volumetric flow moves directly from the attenuation chamber 8 through the orifice 9 with a large orifice opening. The ball-check valve 11 prevents fluid flow back through the orifice 9 to the attenuation chamber 8. Additionally, the ball 13 of the ball-check valve 11 operates in one of two positions: (1) a closed position when the pressure difference at the ball-check valve 11 is not sufficient to move the ball 13 against the force of the spring, and (2) a fully open position when the pressure difference on the ball-check valve 11 reaches the predetermined cracking pressure, and the ball 13 is lifted up from its valve seat 14 to allow fluid to flow through the ball-check valve 11.

U.S. Pat. No. 5,031,969 for example, discloses a throttle switchover valve 1 disposed in the brake circuit between a damper chamber 7 and the master cylinder 9. The throttle switchover valve 1 includes a throttle assembly 34 and a bypass valve 11. Fluid may flow either through the throttle assembly 34 or the bypass valve 11 and is therefore not variable.

U.S. Patent Publication No. 2013/0062933 A1 discloses an attenuator assembly 44 located in an attenuator chamber 102 of a housing 100 in a vehicle braking system 10 and includes an orifice 120 that defines a fluid dampening flow path. The orifice 120 has an outlet opening 120B. A biasing member 132 defines a closing member of the orifice 120. The size of the outlet opening 120B changes continuously between a first open position and a second open position.

It is desired however, to provide a brake system wherein fast brake pressure apply rates may be achieved using a piston type pump with pulsating output flow. It is further desirable to provide an improved structure for an attenuator bypass valve that includes a flow based orifice bypass function during high pump flow events while maintaining the orifice restriction and low NVH behavior during low pump flow events.

SUMMARY OF THE INVENTION

This invention relates to an improved structure for an attenuator bypass valve. In one embodiment, a pump attenuator bypass valve is located at an outlet of a pump in a vehicle braking system between the pump and an attenuator. The attenuator bypass valve includes a bypass valve housing, a first fluid flow path, and a second fluid flow path. The first fluid flow path is defined in the housing and is configured to allow continuous flow of fluid when the pump operates at a first pump flow rate. The second fluid flow path is defined in the housing and is configured to bypass the first fluid flow path and to allow continuous flow of fluid when the pump operates at a second pump flow rate higher than the first pump flow rate.

Various aspects of this invention will become apparent to those skilled in the art from the following detailed description of the preferred embodiment, when read in light of the accompanying drawings.

DETAILED DESCRIPTION OF THE PREFERRED EMBODIMENT

Figure 1:
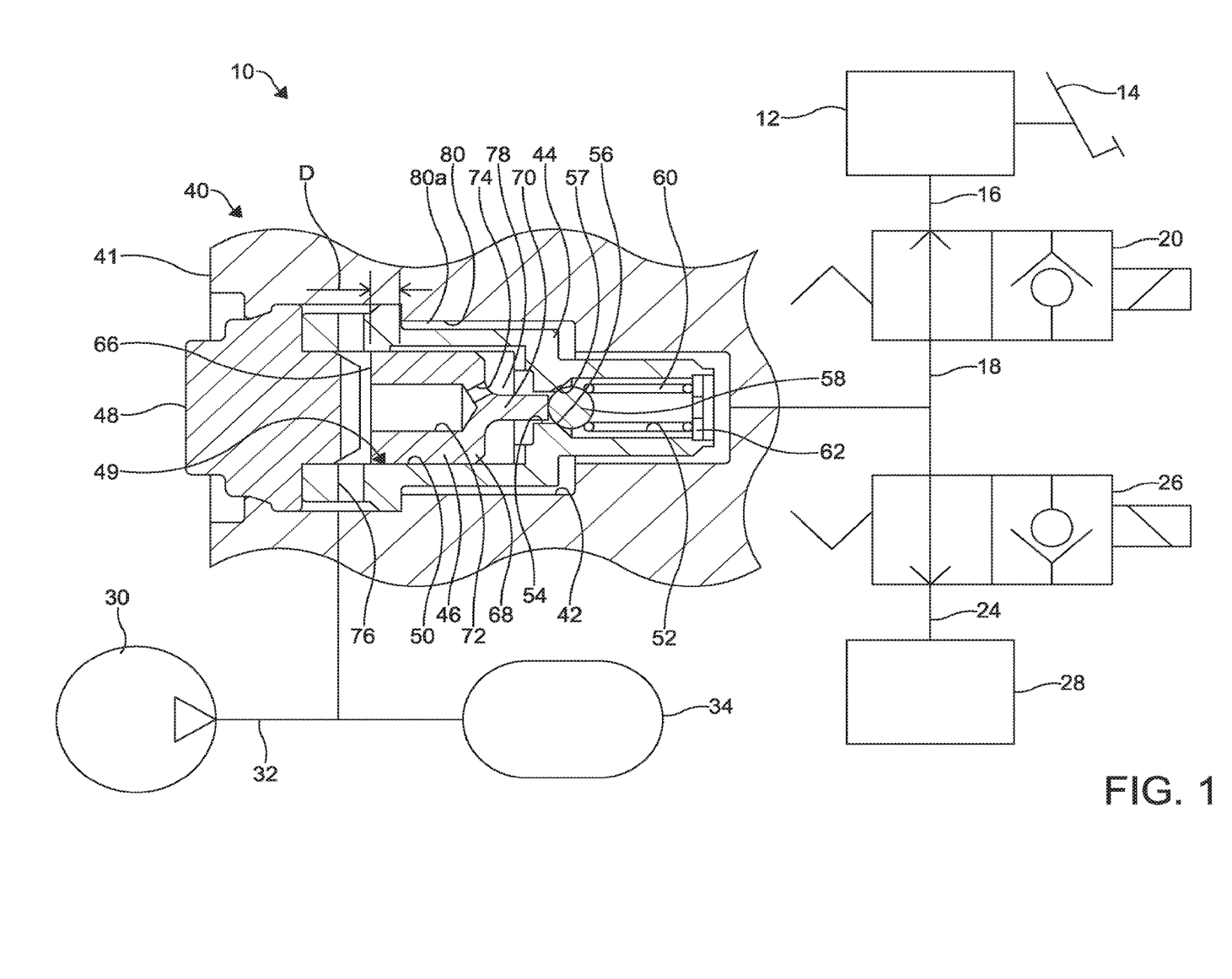
FIG. 1 is a schematic illustration of a brake system including a first embodiment of a bypass valve in accordance with this invention.

Referring now to the drawings, there is illustrated in FIG. 1 a brake system, schematically indicated at 10. The brake system 10 includes a master cylinder, indicated schematically at 12. The master cylinder 12 may be connected with a brake pedal 14 for actuation of the master cylinder 12 by a vehicle driver. The master cylinder 12 may be a conventional master cylinder having one or more pistons that are movable by actuation of the brake pedal 14 such that a fluid pressure is built up within the master cylinder 12 and introduced into a fluid conduit 16. The fluid conduit 16 is in fluid communication with a fluid conduit 18 through a conventional master cylinder valve 20. The master cylinder valve 20 may be electronically controlled such that the master cylinder valve 20 includes a solenoid that is controllable by an electronic control unit (not shown) between an open position, as shown in FIG. 1, and a closed position such that fluid is prevented from flowing from the fluid conduit 18 to the fluid conduit 16. The fluid conduit 18 is further in fluid communication with a fluid conduit 24 through a conventional brake valve 26. The brake valve 26 may be electronically controlled such that the brake valve 26 includes a solenoid that is controllable by the electronic control unit (not shown) between an open position, as shown in FIG. 1, and a closed position such that fluid is prevented from flowing from the fluid conduit 18 to the fluid conduit 24.

The conduit 24 is in fluid communication with a brake module, indicated schematically at 28. The brake module 28 may include one or more conventional wheel brakes, preferably located at each of the wheels of the vehicle in which the brake system 10 is installed. Additionally, the brake module 28 may further include various valve arrangements (not shown) to provide advanced braking features, such as anti-lock braking, traction control, and/or vehicle stability control of two or more of the wheel brakes. The various valve arrangements may be configured to individually regulate the flow of pressurized fluid into the wheel brakes from the conduit 24 and/or provide fluid venting to a fluid reservoir (not shown).

The brake system 10 further includes a pump, indicated schematically at 30. The pump 30 may be a multi-piston pump that is connected to a motor (not shown) for driving the pistons of the pump 30. For example, pump 30 may be a piston type pump with a pulsating output flow. For this type of pump, it is desirable to include a pulsation attenuator in conjunction with a restrictive orifice arrangement to ensure that a desired level of noise, vibration, and harshness (NVH) is achieved during braking events that require low pump flow. However, this restrictive orifice may cause excessive pressure drop and reduced pump flow during high dynamic braking events that require high pump flow. The brake system 10 thus includes an attenuator 34 and a pump attenuator orifice bypass valve (hereinafter "bypass valve"), indicated at 40, to provide a flow based orifice bypass function during high pump flow events while maintaining the orifice restriction and low NVH behavior during low pump flow events. The bypass valve 40 may be housed with a stepped bore 42 of a housing, such as a hydraulic control unit (HCU) 41.

As shown in FIG. 1, the pump 30 provides pressurized fluid flow at a pump outlet conduit 32. The attenuator 34 is in fluid communication with the pump outlet conduit 32. The attenuator 34 may be any suitable attenuator which works in conjunction with the orifice function of the bypass valve 40 to reduce the amplitude of pressure fluctuations in hydraulic fluid lines or housing bores of the vehicle brake system 10 for dampening pump output pressure pulses prior to application to the brake module 28. For example, the attenuator 34 may be mounted in a bore (not shown) of the HCU 41 to significantly reduce the amplitude of high energy pressure pulses in the brake fluid at the outlet of the pump 30. Such pressure pulses can create undesirable noise which is transmitted to the master cylinder 12 or its connection to the vehicle. The attenuator 34 may be conventional in the art and may include an elastomeric member (not shown) and/or slidable cylinders (not shown).

The bypass valve 40 includes a body 44, a poppet 46, and a retainer cap 48. The body 44 is disposed in the stepped bore 42. The body 44 includes a longitudinally extending bore 49 having a first bore portion 50 and a second bore portion 52 in fluid communication with each other by a central passageway 54. The central passageway 54 includes an annular ball valve seat 56. A ball 58 is biased against the ball valve seat 56 by a spring 60 disposed in the second bore portion 52. The spring 60 may be retained within the second bore portion 52 by a spring retainer 62 mounted on an end of the body 44. The ball valve seat 56 may be configured with a small slit 57 formed therein that functions as a relatively small orifice even when the ball 58 is seated on the ball valve seat 56.

The poppet 46 is slidably disposed in the first bore portion 50 of the body 44. The poppet 46 includes a first end 66 and a second end 68. A pin 70 extends from the second end 68 and may contact the ball 58, as shown in FIG. 1. The poppet 46 includes a bore 72 formed in the first end 66 which is in fluid communication with a fixed orifice 74 formed in the second end 68 of the poppet 46. The bore 72 is in fluid communication with the pump outlet conduit 32 through a plurality of passageways 76 formed through the body 44. The fixed orifice 74 is in communication with a chamber 78 generally defined by the second end 68 of the poppet 46 and the first bore portion 50 of the body 44. A groove 80 is formed in the body 44 in the cylindrical wall of the first bore portion 50 and is in communication with the chamber 78. If desired, a plurality of the grooves 80 may be formed in the body 44. As shown in FIG. 1, a first end 80a of the groove 80 (the left end of the groove 80 when viewing FIG. 1) is spaced by a distance D from the first end 66 of the poppet 46. The distance D may be any desired distance, such as from about one mm to about two mm. Alternatively, depending on the position of the first end 80a of the groove 80 relative to the first end 66 of the poppet 46, the distance D may be any other desired distance, including smaller than about one mm and larger than about two mm.

The retainer cap 48 is mounted within the first bore portion 50 of the body 44 by any desired means, such as with a threaded connection. The retainer cap 48 is further retained within the stepped bore 42 of the HCU 41 by any desired means, such as by clinching, staking, or with a threaded connection. If desired, a sealing member, such as an O-ring (not shown) may be disposed between the retainer cap 48 and the stepped bore 42 of the HCU 41 when the retainer cap is retained with a threaded connection.

In operation at low pump flow rates, such as a pump flow rate of less than about five cc/sec, the small slit 57 in the ball valve seat 56 may function as a relatively small orifice flow path through the bypass valve 40. For example, fluid may flow through the bore 72, the fixed orifice 74, and through the small slit 57 in the ball valve seat 56 without urging the ball 58 off of the ball valve seat 56.

When the pump flow rate is above a predetermined pump flow rate (e.g., a peak pump flow rate of more than about five cc/sec), fluid pressure within the bore 72 of the poppet 46 increases, urging the poppet 46 toward the ball valve seat 56 (to the right when viewing FIG. 1) and overcoming the force of the spring 60, thus causing the pin 70 to move the ball 58 off of the ball valve seat 56. As the ball 58 first moves off of the ball valve seat 56, the fluid pressure in the chamber 78 drops, further urging the second end 68 of the poppet 46 toward the ball valve seat 56.

As the pump flow rate increases above the predetermined pump flow rate, the poppet 46 will continue to move toward the ball valve seat 56 (to the right when viewing FIG. 1) until the poppet 46 has traveled the distance D, thus opening the groove 80 and allowing fluid to flow into and through the groove 80 and through the open ball valve seat 56, thereby providing an additional fluid flow path that bypasses fixed orifice 74.

The operating characteristics of the bypass valve 40 may be tuned by varying various features of the bypass valve 40. For example, the following features may be varied: the size of the portion of the poppet 46 exposed to pressurized fluid from the pump 30, the size of the ball valve seat 56, the size of the poppet orifice 74, the load or rate of the ball 58 and the spring 60, and the travel distance D that the poppet 46 is required to move to open the groove 80 and allow the fluid to bypass the poppet orifice 74. Advantageously, the bypass valve 40 may be tuned such that the poppet orifice 74 and the slit 57 may be continually bypassed at high flow rates, even through a pulsating pump flow through the pump 30 may drop to about zero during each subsequent pump inlet stroke. This allows the pump flow to be relatively unrestricted at the beginning of each pump output stroke, which may improve the overall efficiency of the pump 30 and motor system (not shown) and a brake pressure apply rate.

Figure 2:
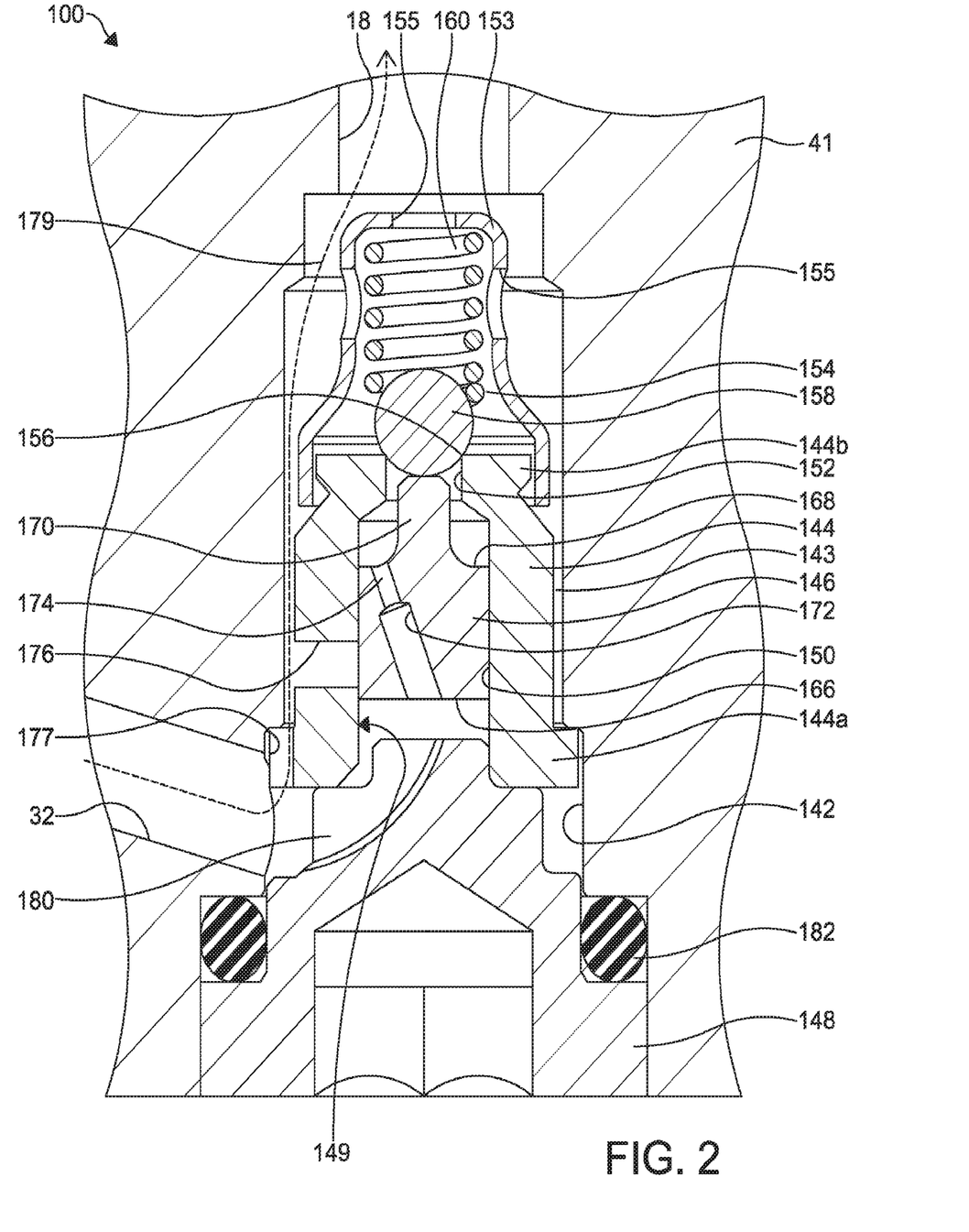
FIG. 2 is a cross-sectional view of a second embodiment of a bypass valve in accordance with this invention showing the bypass valve in a non-shuttled position.
Figure 3:
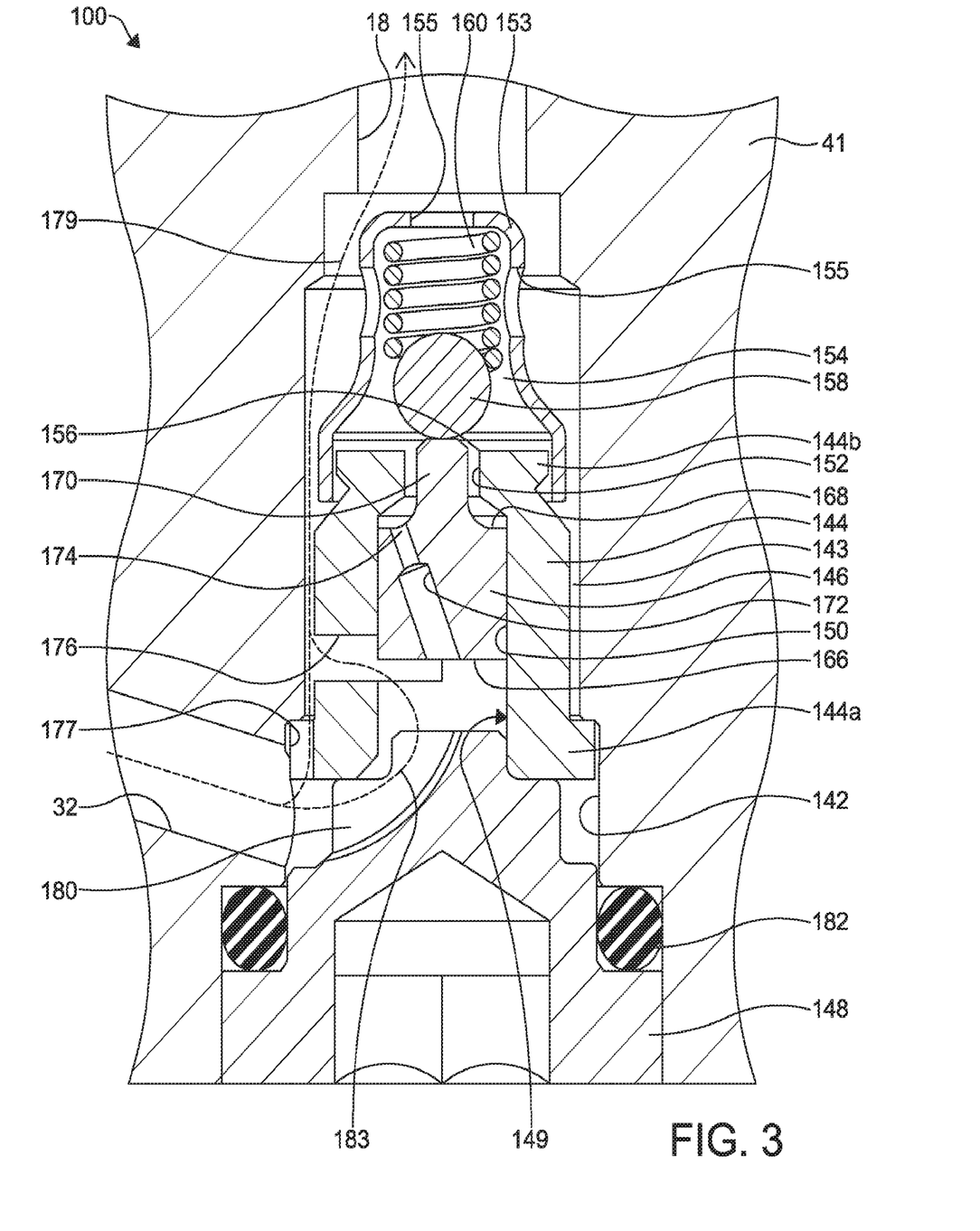
FIG. 3 is a cross-sectional view of the bypass valve illustrated in FIG. 2 showing the bypass valve in a shuttled position.

Referring now to FIGS. 2 and 3, a second embodiment of a bypass valve is indicated generally at 100. The bypass valve 100 may be substituted for the bypass valve 40 in the brake system 10. The bypass valve 100 is shown in an unactuated or non-shuttled position in FIG. 2, and in an actuated or a shuttled position in FIG. 3. Like the bypass valve 40, the bypass valve 100 may be housed within a stepped bore 142 of the HCU 41. The bypass valve 100 includes a body 144, a poppet 146, and a retainer cap 148. The body 144 is disposed in the stepped bore 142, has a first end 144a and a second end 144b, and includes a longitudinally extending bore 149 having first bore portion 150 and a second bore portion 152. An outside diameter of the body 144 is smaller than an inside diameter of the portion of the stepped bore 142 within which the body 144 is disposed, thus defining an annular fluid flow channel 143.

A substantially cup-shaped spring cap 153 has a plurality of fluid flow holes 155 and is attached to the second end 144b of the body 144 by any desired means, such as by crimping. The spring cap 153 defines a cavity 154 therein. The second bore portion 152 of the body 144 defines an annular ball valve seat 156. A ball 158 is biased against the ball valve seat 156 by a spring 160 disposed in the cavity 154 of the spring cap 153.

The poppet 146 is slidably disposed in the first bore portion 150 of the body 144. The poppet 146 includes a first end 166 and a second end 168. A pin 170 extends from the second end 168 and may contact the ball 158, as shown in FIGS. 2 and 3. The poppet 146 includes a bore 172 formed in the first end 166 which is in fluid communication with a fixed orifice 174 formed in the second end 168 of the poppet 146. The bore 172 is in fluid communication with the pump outlet conduit 32 through one or more transverse passageways 176 formed through the body 144, as well as a longitudinally extending notch or groove 177 formed at the first end 144a of the body 144, and a slot 180 formed in the retainer cap 148. The groove 177 may have any desired size determined by the volume of fluid required to travel therethrough. For example, the groove 177 may have a cross-sectional area equivalent to a circular opening having a diameter of about 0.3 mm. Similarly, the passageway 176 may have any desired size determined by the volume of fluid required to travel therethrough. For example, the passageway 176 may have a cross-sectional area equivalent to a circular opening having a diameter of about 2.0 mm.

The retainer cap 148 is mounted within the first bore portion 150 of the body 144 by any desired means, such as with a threaded connection. The retainer cap 148 is further retained within the stepped bore 142 of the HCU 41 by any desired means, such as by clinching, staking, or with a threaded connection. If desired, a sealing member, such as an O-ring 182 may be disposed between the retainer cap 148 and the stepped bore 142 of the HCU 41 when the retainer cap is retained with a threaded connection as shown.

In operation at low flow rates, such as a pump flow rate of less than about five cc/sec, the groove 177 in the body 144 may function as a relatively small orifice flow path through the bypass valve 100. For example, fluid may flow from the pump outlet conduit 32, through the groove 177 and the annular fluid flow channel 143, to the fluid conduit 18 along a first fluid flow path indicated by the line 179. Unlike the bypass valve 40, the ball valve seat 156 does not include a small slit. The bypass valve 100 is configured such that fluid may not need to flow through the spring loaded valve seat 156. The ball 158 may be used, for example, only to impart a spring force from the spring 160 against the poppet 146.

When the pump flow rate is above a predetermined pump flow rate (e.g., a peak pump flow rate of more than about five cc/sec), fluid may additionally flow through the slot 180 formed in the retainer cap 148.

As fluid pressure within the first bore portion 150 increases, the poppet 146 is urged toward the ball valve seat 156 (upwardly when viewing FIGS. 2 and 3) thus overcoming the force of the spring 160, and causing the pin 170 to move the ball 158 off of the ball valve seat 156. As fluid pressure within the slot 180 and the first bore portion 150 increases, the first end 166 of the poppet 146 is caused to move past an edge of the passageway 176, thus allowing fluid to flow from the slot 180 to the passageway 176, and defining a second fluid flow path indicated by the line 183. From the passageway 176, fluid moving along the second fluid flow path 183 joins the fluid moving along the first fluid flow path 179 in the annular fluid flow channel 143.

Although a potential fluid path may be created through the valve seat 156 when the ball 158 is lifted therefrom, there are generally equal fluid pressures acting around the ball 158, and fluid flow through the valve seat 156 may therefore be negligible.

Figure 4:
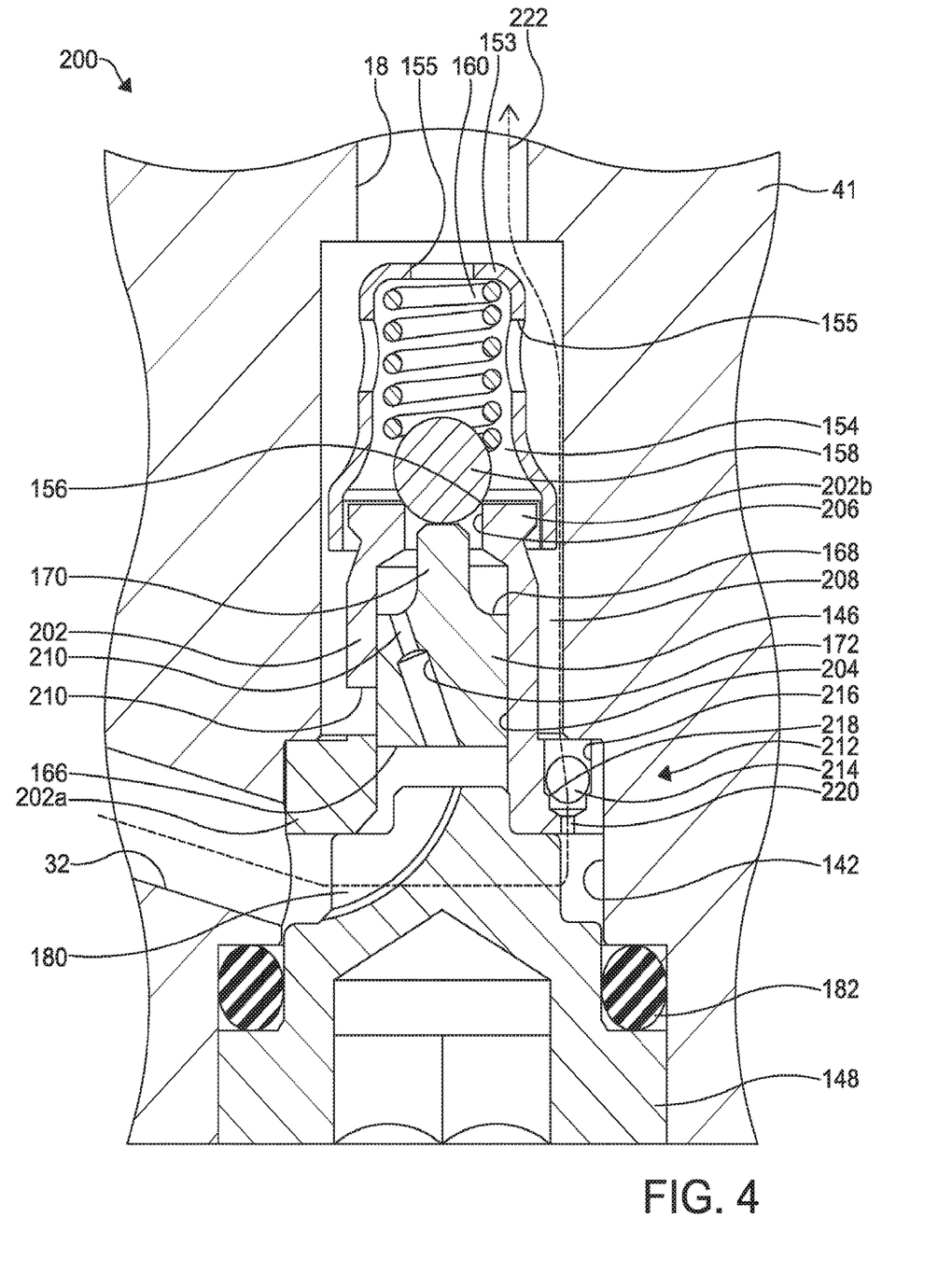
FIG. 4 is a cross-sectional view of a third embodiment of a bypass valve in accordance with this invention showing the bypass valve in a non-shuttled position.

Referring now to FIG. 4, a third embodiment of a bypass valve is indicated generally at 200. The bypass valve 200 may be substituted for the bypass valve 40 in the brake system 10. The bypass valve 200 is similar in structure and function as the bypass valve 100 described above, and like numerals are used to indicate like parts.

Like the bypass valve 100, the bypass valve 200 may be housed within the stepped bore 142 of the HCU 41. The bypass valve 200 includes a body 202, the poppet 146, and the retainer cap 148. The body 202 is disposed in the stepped bore 142, has a first end 202a and a second end 202b, and includes a longitudinally extending bore 201 having first bore portion 204 and a second bore portion 206. The substantially cup-shaped spring cap 153 is attached to the second end 202b of the body 202 as described above.

An outside diameter of the body 202 is smaller than an inside diameter of the portion of the stepped bore 142 within which the body 202 is disposed, thus defining an annular fluid flow channel 208.

The bore 172 is in fluid communication with the pump outlet conduit 32 through one or more transverse passageways 210 formed through the body 202 and the slot 180 formed in the retainer cap 148.

The bypass valve 200 differs from the bypass valve 100 in that it includes a cut-off feature or cut off valve assembly, indicated generally at 212. The cut off valve assembly 212 helps reduce the fluid displacement in the brake system in which the bypass valve 200 is installed. Similar to the groove 177 of the bypass valve 100, the cut off valve assembly 212 provides a fluid flow path from the pump outlet conduit 32 to the fluid conduit 18 through the bypass valve 200. Significantly however, fluid flow is prevented from flowing in the opposite direction; i.e. fluid may not flow from the fluid conduit 18 to the pump outlet conduit 32 through the cut off valve assembly 212.

The cut off valve assembly 212 includes a ball 214 disposed in a bore 216 formed in the first end 202a of the body 202. The ball 214 may rest against a valve seat 218. The pump outlet conduit 32 is in fluid communication with the bore 216 via an orifice 220. The orifice 220 may have any desired size determined by the volume of fluid required to travel therethrough. For example, the orifice 220 may have a diameter of about 0.3 mm.

The cut off valve assembly 212 may be useful during normal braking when the driver pushes on the brake pedal 14 causing a buildup of pressure at an outlet of the master cylinder 12. The cut off valve assembly 212 prevents the flow of fluid from the fluid conduit 18 into the conduit 32 and into the attenuator 34, thereby reducing any undesirable pedal movement that may otherwise occur. It will be understood that the flow of fluid is also prevented from the fluid conduit 18 into the conduit 32 and into the attenuator 34 through the ball valve seat 156.

In operation at low flow rates, such as a pump flow rate of less than about five cc/sec, fluid may flow from the pump outlet conduit 32 into the orifice 220. This flow of fluid will lift the ball 214 off of the valve seat 218, thus allowing the fluid to flow along a first fluid flow path indicated by the dashed line 222.

When the pump flow rate is above a predetermined pump flow rate (e.g., a peak pump flow rate of more than about five cc/sec), fluid may additionally flow through the slot 180 formed in the retainer cap 148.

As fluid pressure acting on the first end 166 of the poppet 146 within the first bore portion 204 increases, the poppet 146 is urged toward the ball valve seat 156 (upwardly when viewing FIG. 4) thus overcoming the force of the spring 160, and causing the pin 170 to move the ball 158 off of the ball valve seat 156. As fluid pressure within the slot 180 and the first bore portion 204 increases, the first end 166 of the poppet 146 is caused to move past an edge of the passageway 210, thus allowing fluid to flow from the slot 180 to the passageway 210, and defining a second fluid flow path as described above and as indicated by the line 183 in FIG. 3. From the passageway 210, fluid moving along the second fluid flow path 183 joins the fluid moving along the first fluid flow path 222 in the annular fluid flow channel 208.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A pump attenuator bypass valve located at an outlet of a pump in a vehicle braking system between the pump and an attenuator, the pump attenuator bypass valve comprising:
   a bypass valve housing;
   a body disposed in a bore of the bypass valve housing, wherein an outside diameter of the body is smaller than an inside diameter of the bore of the bypass valve housing; a space between the outside diameter of the body and the inside diameter of the bore of the bypass valve housing defining an annular fluid flow channel;
   the body having a first end, a second end, and a longitudinally extending bore, wherein a transverse passageway is formed through the body from the longitudinally extending bore to the annular fluid flow channel, and wherein a longitudinally extending groove is formed at the first end of the body and provides fluid communication between the pump and the annular fluid flow channel;
   an annular ball valve seat formed in the longitudinally extending bore of the body;
   a ball biased against the ball valve seat and defining a valve closing member;
   a poppet slidably disposed in the longitudinally extending bore of the body and engaging the ball, the poppet including an orifice formed therethrough and in fluid communication between the pump and the ball valve seat;
   a retainer cap mounted within the bore of the bypass valve housing, the retainer cap engaging the first end of the body and having a slot formed therein, the slot in fluid communication between the pump and a first end of the poppet;
   a first fluid flow path; and
   a second fluid flow path;
   characterized in that:
   the first fluid flow path is defined in the bypass valve housing and is configured to allow continuous flow of fluid when the pump operates at a first pump flow rate;
   the second fluid flow path is defined in the bypass valve housing and is configured to bypass the first fluid flow path and to allow continuous flow of fluid when the pump operates at a second pump flow rate higher than the first pump flow rate; and
   wherein the annular fluid flow channel defines a portion of the second fluid flow path;
   wherein the longitudinally extending groove formed at the first end of the body and the annular fluid flow channel define a portion of the first fluid flow path; and
   wherein the slot formed in the retainer cap and the transverse passageway formed through the body define a portion of the second fluid flow path.

2. The pump attenuator bypass valve according to claim 1, wherein the flow of fluid through the pump is a pulsating pump flow, and wherein the pump attenuator bypass valve is configured to maintain fluid flow in the second fluid flow path when the pump operates at the second pump flow rate and when the pulsating flow through the pump drops to about zero during a pump inlet stroke and during each subsequent pump inlet stroke.

3. The pump attenuator bypass valve according to claim 1, wherein the first pump flow rate is less than or equal to about 5 cc/sec, and wherein the second pump flow rate is greater than about 5 cc/sec.

4. The pump attenuator bypass valve according to claim 1, wherein the retainer cap provides a fluid-tight seal at one end of the bore of the bypass valve housing.

5. The pump attenuator bypass valve according to claim 1, further including a spring cap attached to the second end of the body and defining a cavity therein, the spring cap having a plurality of fluid flow holes formed therethrough.

6. The pump attenuator bypass valve according to claim 1, wherein the flow of fluid through the pump is a pulsating pump flow, and wherein the pump attenuator bypass valve is configured to maintain fluid flow in the second fluid flow path when the pump operates at the second pump flow rate and when the pulsating flow through the pump drops to about zero during a pump inlet stroke and during each subsequent pump inlet stroke.

7. The pump attenuator bypass valve according to claim 6, wherein the first pump flow rate is less than or equal to about 5 cc/sec, and wherein the second pump flow rate is greater than about 5 cc/sec.

8. The pump attenuator bypass valve according to claim 1, wherein when the pump operates at the second pump flow rate, fluid pressure acting on the first end of the poppet urges the poppet toward the ball valve seat, opening the transverse passageway and allowing fluid to flow through the slot formed in the retainer cap, the transverse passageway formed through the body, and the annular fluid flow channel.

\* \* \* \* \*